United States Patent
Ozzie et al.

(10) Patent No.: US 7,689,524 B2
(45) Date of Patent: Mar. 30, 2010

(54) DYNAMIC ENVIRONMENT EVALUATION AND SERVICE ADJUSTMENT BASED ON MULTIPLE USER PROFILES INCLUDING DATA CLASSIFICATION AND INFORMATION SHARING WITH AUTHORIZED OTHER USERS

(75) Inventors: Raymond E. Ozzie, Seattle, WA (US); William H. Gates, III, Medina, WA (US); Gary W. Flake, Bellevue, WA (US); Thomas F. Bergstraesser, Kirkland, WA (US); Arnold N. Blinn, Hunts Point, WA (US); William J. Bolosky, Issaquah, WA (US); Christopher W. Brumme, Mercer Island, WA (US); Lili Cheng, Bellevue, WA (US); Michael Connolly, Seattle, WA (US); Dane A. Glasgow, Medina, WA (US); Daniel S. Glasser, Mercer Island, WA (US); Alexander G. Gounares, Kirkland, WA (US); James R. Larus, Mercer Island, WA (US); Matthew B. MacLaurin, Woodinville, WA (US); Henricus Johannes Maria Meijer, Mercer Island, WA (US); Debi P. Mishra, Bellevue, WA (US); Amit Mital, Kirkland, WA (US); Ira L. Snyder, Jr., Bellevue, WA (US); Chandramohan A. Thekkath, Palo Alto, CA (US); Melora Zaner-Godsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 647 days.

(21) Appl. No.: 11/536,488

(22) Filed: Sep. 28, 2006

(65) Prior Publication Data
US 2008/0082464 A1 Apr. 3, 2008

(51) Int. Cl.
*G06F 15/18* (2006.01)
*G06F 17/00* (2006.01)
*G06F 5/00* (2006.01)
*G06F 9/44* (2006.01)
*G06F 15/16* (2006.01)
*G06N 7/02* (2006.01)
*G06N 7/06* (2006.01)

(52) U.S. Cl. .............................. 706/45; 706/12; 706/52; 709/206; 709/207

(58) Field of Classification Search .................. 706/12, 706/45, 52; 709/206–207
See application file for complete search history.

(56) References Cited

U.S. PATENT DOCUMENTS 5,263,165 A 11/1993 Janis (Continued)

FOREIGN PATENT DOCUMENTS

EP 1376309 1/2004

(Continued)

OTHER PUBLICATIONS

Wilikens, M. et al. "PRIME: Privacy and Identity Management for Europe: Requirements Version 0—Part 3: Application Requirements" Oct. 2004.*

(Continued)

*Primary Examiner*—David R Vincent
*Assistant Examiner*—Benjamin Buss
(74) *Attorney, Agent, or Firm*—Lee & Hayes, PLLC

(57) ABSTRACT

An intelligent personalized agent monitors, regulates, and advises a user in decision-making processes for efficiency or safety concerns. The agent monitors an environment and present characteristics of a user and analyzes such information in view of stored preferences specific to one of multiple profiles of the user. Based on the analysis, the agent can suggest or automatically implement a solution to a given issue or problem. In addition, the agent can identify another potential issue that requires attention and suggests or implements action accordingly. Furthermore, the agent can communicate with other users or devices by providing and acquiring information to assist in future decisions. All aspects of environment observation, decision assistance, and external communication can be flexibly limited or allowed as desired by the user.

11 Claims, 12 Drawing Sheets

U.S. PATENT DOCUMENTS

| | | | |
|---|---|---|---|
| 5,537,404 | A | 7/1996 | Bentley et al. |
| 6,064,656 | A | 5/2000 | Angal et al. |
| 6,195,683 | B1 | 2/2001 | Palmer et al. |
| 6,209,039 | B1 | 3/2001 | Albright et al. |
| 6,226,260 | B1 | 5/2001 | McDysan |
| 6,341,127 | B1 | 1/2002 | Katsube et al. |
| 6,434,532 | B2 | 8/2002 | Goldband et al. |
| 6,469,991 | B1 | 10/2002 | Chuah |
| 6,496,482 | B1 | 12/2002 | Kubota |
| 6,681,108 | B1 * | 1/2004 | Terry et al. ............ 455/412.2 |
| 6,707,820 | B1 | 3/2004 | Arndt et al. |
| 6,745,224 | B1 | 6/2004 | D'Souza et al. |
| 6,917,975 | B2 | 7/2005 | Griffin et al. |
| 6,961,318 | B2 | 11/2005 | Fichou et al. |
| 7,002,926 | B1 | 2/2006 | Eneboe et al. |
| 7,065,041 | B2 | 6/2006 | Sen |
| 2002/0083025 | A1 * | 6/2002 | Robarts et al. ............ 706/12 |
| 2002/0124053 | A1 | 9/2002 | Adams et al. |
| 2003/0105734 | A1 | 6/2003 | Hitchen et al. |
| 2003/0204632 | A1 * | 10/2003 | Willebeek-LeMair et al. ............ 709/249 |
| 2003/0229623 | A1 | 12/2003 | Chang et al. |
| 2004/0076160 | A1 | 4/2004 | Phaltankar |
| 2004/0098456 | A1 | 5/2004 | Kryzanowski et al. |
| 2004/0190547 | A1 * | 9/2004 | Gordy et al. ............ 370/463 |
| 2005/0138419 | A1 | 6/2005 | Gupta et al. |
| 2005/0204001 | A1 * | 9/2005 | Stein et al. ............ 709/206 |
| 2005/0238024 | A1 | 10/2005 | Taylor et al. |
| 2005/0262132 | A1 | 11/2005 | Morita et al. |
| 2005/0289234 | A1 | 12/2005 | Dai et al. |
| 2006/0020700 | A1 | 1/2006 | Qiu et al. |
| 2006/0031518 | A1 | 2/2006 | Jennings |
| 2006/0036904 | A1 | 2/2006 | Yang |
| 2006/0048224 | A1 | 3/2006 | Duncan et al. |
| 2006/0062161 | A1 | 3/2006 | Tang et al. |
| 2006/0123005 | A1 | 6/2006 | Burnett et al. |
| 2006/0190997 | A1 * | 8/2006 | Mahajani et al. ............ 726/10 |
| 2006/0218111 | A1 * | 9/2006 | Cohen ............ 706/12 |

FOREIGN PATENT DOCUMENTS

| | | |
|---|---|---|
| EP | 1524580 A2 | 4/2005 |
| EP | 1564622 | 8/2005 |
| WO | 2005022826 | 3/2005 |

OTHER PUBLICATIONS

Al-Muhtadi,J. "An Intelligent Authentication Infrastructure for Ubiquitous Computing Environments" PhD Disseratation, University of Illinois at Urbana-Champaign. 2005.*

International Search Report and Written Opinion for PCT Patent Application PCT/US2007/079610, completed Nov. 14, 2008 and mailed Nov. 18, 2008, 13 pages.

Brunner, et al. "Disruption Tolerant Networking" Dagstuhl Seminar Proceedings (2005) NEC Europe Ltd., Network Labooratories, 4 pages.

Fox, et al. "Towards Flexible Messaging for SOAP Based Services" (2004) IEEE, 11 pages.

Gunduz, et al. "A Framework for Aggregating Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29 , Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

James Surowiecki. The Wisdom of Crowds. Doubleday, 2004.

Sandhu, et al. Access Control: Principles and Practice. IEEE Communications Magazine, Sep. 1994.

System Management Concepts: Operating System and Devices, http://www.dlib.indiana.edu/doc_link/en_US/a_doc_lib/aixbman/admnconc/audit.htm. Last accessed Sep. 20, 2006.

Hughes, et al. Automated Verification of Access Control Policies. http://www.cs.ucsb.edu/~bultan/publications/tech-report04.pdf. Last accessed Sep. 20, 2006. Technical Report 2004-22. Dept. of Computer Science. University of California, Santa Barbara. 2004.

Cederquist, et al. An Audit Logic for Accountability. 2005. http://www.citebase.org/fulltext?format=application/pdf&identifier=oai:arXiv.org:cs/0502091. Last accessed Sep. 20, 2006.

* cited by examiner

DYNAMIC ENVIRONMENT EVALUATION AND SERVICE ADJUSTMENT BASED ON MULTIPLE USER PROFILES INCLUDING DATA CLASSIFICATION AND INFORMATION SHARING WITH AUTHORIZED OTHER USERS

BACKGROUND

Individuals interact with their environments in various manners. Some people have an acute sense of awareness, while others can be somewhat oblivious to their surroundings. For any given person, unique circumstances that depend on level of importance of a particular situation can affect his/her behavior. For example, in some settings, such as during a job interview or other important meeting, one may be highly perceptive to his/her environment, including observation of reactions, behavior, and presence of others. In turn, this information naturally influences his/her behavior within in such environment. In other settings, such as during grocery shopping or other routine errands, one may not be as concerned with devoting his/her attention to especially detailed aspects of the surroundings.

In many situations, one may be too busy or otherwise unable to fully observe and interpret his/her environment. Sometimes an individual simply needs assistance with scheduling activities, navigating through directions, and coordinating with others for reasons of safety or convenience. For instance, an individual that is lost may need help with determining where he/she is currently located, in addition to planning a route to a desired destination. Furthermore, respective individuals desire different levels of assistance that should take into account their unique reactions and preferences. For example, in making a selection, such as for a cleaning service, gas station, or tourist attraction, different people presented with the same options may likely have varying opinions and make personalized decisions based on past experiences, observations, and suggestions from others. Accordingly, the marketplace (as well as life in general) comprises a vast variety of resources, services, attractions so as to meet unique demands of individuals. However, as a result of ever increasing advances in computing and communications technologies, the amount of choices available to people as grown to a point where selection and decision making can be difficult let alone a nuisance. In view of the wide selection of options presented in many aspects of everyday existence, a person can live and work more efficiently with at least some external assistance in regulating, monitoring, and advising decisions in his/her own life.

SUMMARY

The following presents a simplified summary of the claimed subject matter in order to provide a basic understanding of some aspects described herein. This summary is not an extensive overview and is not intended to identify key/critical elements or to delineate the scope of the claimed subject matter. Its sole purpose is to present a summary of the following detailed description of preferred embodiments of the invention.

An intelligent personalized agent (e.g., guardian angel) monitors and evaluates a user's environment to assist in decision-making processes on behalf of the user. Such implementation may be presented in the form of a software assisted mind amplifier. The amplifier analyzes preferences and predicts future actions based on the analysis. For example, if a user is at a shopping mall, the guardian angel can evaluate the surrounding environment with respect to the user's own attributes and preferences and determine or infer that the time of day is noon, the user has not eaten lunch, and there are no pending appointments at the moment. The guardian angel with knowledge of the user's favorite foods, last time frames for consumption of such favorite foods, and available restaurants in proximity to the user can provide directions to the nearest positively rated restaurant that serves such favorite food as well as (in the background) check for seating availability, and make a reservation (if needed). Thus, the guardian angel can, based on environment, user state, preferences, and available resources, take automated action on behalf of the user for various purposes (e.g., to compensate for memory loss, to remind a user to take medicine, to assist in social interactions by indicating whether the user has met an individual before, to gauge the appropriateness of jokes or comments given the demographics of the audience, etc.).

The guardian angel can continuously monitor a variety of factors in a user's environment, including aspects related to: location, time, velocity, acceleration, local commerce/retail structures, altitude, temperature, biographical information, proximity/relationship to other objects, capability of other objects, application/relevancy/usage, and Internet/email configuration. Mechanical and/or electromagnetic devices may be used to monitor a user's physical/mental state within the context of a particular environment. For example, a sensor can be attached to the user to monitor his/her heartbeat with respect to his/her current activity (e.g. a higher heartbeat is normal during exercise, while a lower heartbeat is normal during rest). Furthermore, a device may directly interact with a brain without bulky attachments. The guardian angel combines such environmental factors with past, present, and/or future preferences as well as attributes of the user to suggest options in a decision-making process. A utility-based analysis can be performed in connection with making an automated decision as a function of expected benefit versus cost of making an incorrect decision.

Any of the above information can be shared or held private as desired by the user. Shared information can be especially useful when applied to coordination devices, for example, when a group of friends are traveling together and would like to easily coordinate a time and place to meet. Information sharing can be based on trust and/or restricted to a specific window of time. In addition, a user may be hesitant to share his information to unfamiliar services and limit such exposure accordingly. The guardian angel can also evaluate the reputation of those services to assist the user in a determination of whether or not he wants to interact with a particular service.

Furthermore, the guardian angel can manage multiple personas for a given user. In an example, a user may want to have a default or core persona for work, but maintain separate personas for school, extracurricular activities, and personal life. Each persona may have distinct preferences, security defaults, subscriptions, memory settings, etc.

To the accomplishment of the foregoing and related ends, certain illustrative aspects are described herein in connection with the following description and the annexed drawings. These aspects are indicative, however, of but a few of the various ways in which the principles of the claimed subject matter may be employed, and such subject matter is intended to include all such aspects and their equivalents. Other advantages and novel features may become apparent from the following detailed description when considered in conjunction with the drawings.

DETAILED DESCRIPTION

Figure 1:
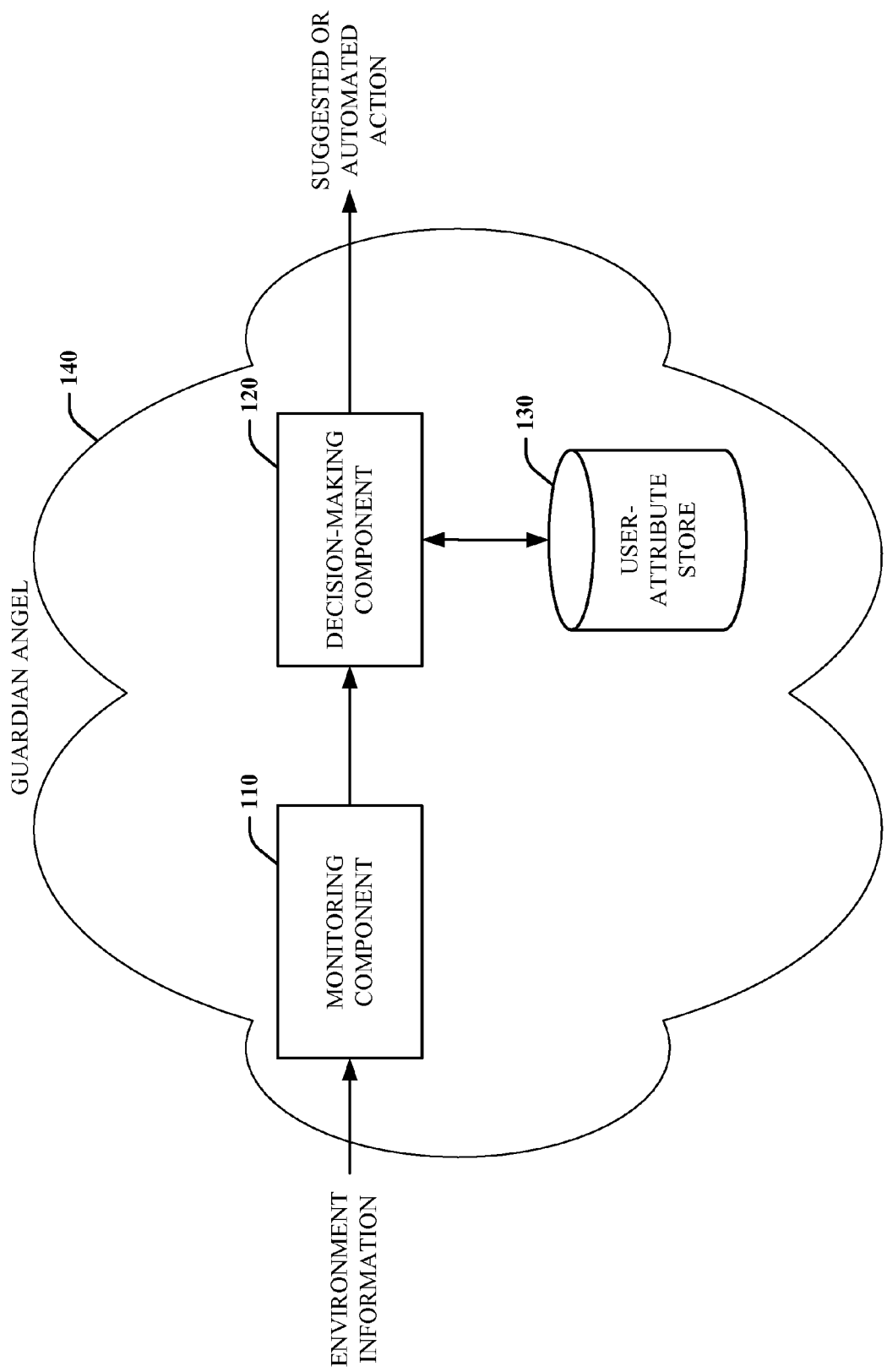
FIG. 1 is a block diagram of an environment evaluation system (guardian angel).

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

FIG. 1 is a block diagram of an environment evaluation system (guardian angel) 140 that provides suggestions and assistance in decision-making processes for an individual. The guardian angel 140 receives and analyzes information with respect to a surrounding environment in the context of unique characteristics of a user and offers one or more suggestions regarding the situation at hand. The guardian angel 140 comprises a monitoring component 110 that collects and filters the information, and a decision-making component 120 that evaluates relevant environment information in view of a user-attribute store 130 of preferences specific to the user.

The evaluation can result in a suggestion or automatic action that provides assistance, implements a decision, or suggests a solution to the issue in question. The guardian angel is not limited to a particular device, area of information, or monitoring scheme, but rather is a flexible and customizable tool to help regulate, monitor, and advise a user in the context of his/her environment. The guardian angel can be preprogrammed and sold to be employed amongst a plurality of users.

The guardian angel 140 can detect a wide variety of states and extrinsic information, such as, for example, location, change in location, time of day, velocity of travel, acceleration, altitude, temperature, sound, identification, proximity, and movement. Not only does the guardian angel 140 monitor an environment, but also a user (e.g., heartbeat, body temperature, mood, etc.). In other words, as the guardian angel 140 is focusing on its main goal of, for instance, detecting users with a disease (e.g., as evidenced by, among other symptoms, a high body temperature) and precluding those users from entering a restricted area, the guardian angel may be informed of other supplemental issues that may or may not be directly related to the main task. In another example, while monitoring a user's environment for weather and traffic, the guardian angel 140 can suddenly notice that the user's heartbeat has stopped and therefore takes automatic action to call for help. A variety features of a guardian angel may be controlled by the user, such that the user can influence, set preferences, automate, script, upgrade, allow/deny permissions and turn on/off one or more aspects of the guardian angel at any time as he/she chooses.

The monitoring component 110 receives information setting forth details regarding an environment (e.g. time of day, location, outside temperature, etc.), as well as the present status pertaining to a user (e.g., body temperature, hunger level, etc.). For example, the monitoring component 110 can take note of the number of conversations occurring in a room (and more specifically, a breakdown of the types of people in the room accompanied by a warning for dangerous persons, based on sex offender registration, FBI most wanted, etc.), relative proximity of the user to various devices and people, the last time the user typed a key on a keyboard, and amount and subject of interaction with others. A user may restrict the monitoring component 110 to observations that are specifically permitted in advance by the user. The monitoring component 110 sends relevant information for current or future decisions to the decision-making component 120 that analyzes the information within the context of personal preference data stored in the user-attribute store 130 in order to make a suggestion or implement a decision. Such decision is made consistent with helping the user, as well as avoiding situations where the user would be harmed. The decision-making component 120 stores potentially relevant information for future use in the user-attribute store 130. For example, the decision-making component 120 can receive environment information regarding time of day, hunger level, the location of the user, and proximate restaurants and analyzes such information in connection with preferences saved in the user-attribute store 130 setting forth the user's schedule and favored restaurants. The decision-making component 120 can suggest a restaurant to the user or automatically make reservations at a selected restaurant. The decision-making component 120 may concurrently manage multiple suggestions and actions that span a wide range of services.

The user-attribute store 130 is a comprehensive container of personalized data regarding a user. The user-attribute store 130 can be configured and updated directly by a user as an explicit process and continually updated with information as received by the decision-making component 120 as an implicit process. In addition, the user-attribute store 130 can be updated with information received or implied from circumstances after a decision is made. For instance, the user can initially load and return to update his/her schedule and list of preferred dry cleaning services, restaurants, stores, etc. as well as corresponding contact phone numbers, addresses, menus, and ratings. As the user travels through a new environment, the user-attribute store 130 is continually updated with data relating to the new environment that will likely apply to his/her preferences. The information in the user-attribute store 130 may be supplemented, deleted, and modified at any time by multiple parties, but the owner (user) of the user-attribute store 130 can limit access to certain areas or times (e.g., modification by another source is authorized to update a restaurant phone number, but not authorized to change the user's schedule).

It is to be appreciated that embodiments described herein can employ various machine learning-based schemes for carrying out various aspects thereof. For example, decision-making analysis can involve using an automatic classifier system and process. The classifiers can be employed to determine and/or infer a need for action, to assist with what information should be analyzed to generate a suggestion and determine if the suggestion should be implemented, and to automatically update stored information relating to stated or implied preferences of a user. The classifiers can also apply a utility-based analysis that considers the cost associated with implementing a suggested course of action against the expected benefit to the user, in view of costs suffered in the event the action was not desired. Moreover, current user state (e.g., amount of free time, urgency, need for accuracy, user frustration, display device capabilities . . . ) can be considered in connection with recognition in accordance with the embodiments described herein.

A classifier is a function that maps an input attribute vector, $X=(x_1, x_2, x_3, x_4, \ldots x_n)$, to a confidence that the input belongs to a class, that is, $f(X)=\text{confidence(class)}$. Such classification can employ a probabilistic and/or statistical-based analysis (for example, factoring into the analysis utilities and costs) to prognose or infer an action that a user desires to be automatically performed (e.g., make corrections to incorrectly interpreted handwriting).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to, training data. Other directed and undirected (e.g., supervised and unsupervised) model classification approaches include, e.g., static and dynamic Bayesian networks, decision trees, and probabilistic graphical models providing different patterns of independence can be employed. Classification as used herein also is inclusive of statistical regression that is utilized to develop models of priority.

As will be readily appreciated from the subject specification, the subject invention can employ supervised classifiers that are explicitly trained (for example, by a generic training data) as well as semi-supervised or unsupervised classifiers that are implicitly trained (for example, by observing user behavior, receiving extrinsic information). For example, SVMs are configured by a learning or training phase within a classifier constructor and feature selection module. Thus, the classifier(s) can be used to automatically perform a number of functions as described herein. Accordingly, the monitoring component 110, decision-making component 120, and user-attribute store 130 can optionally employ classifiers in connection with effecting the functionalities associated therewith.

Figure 2:
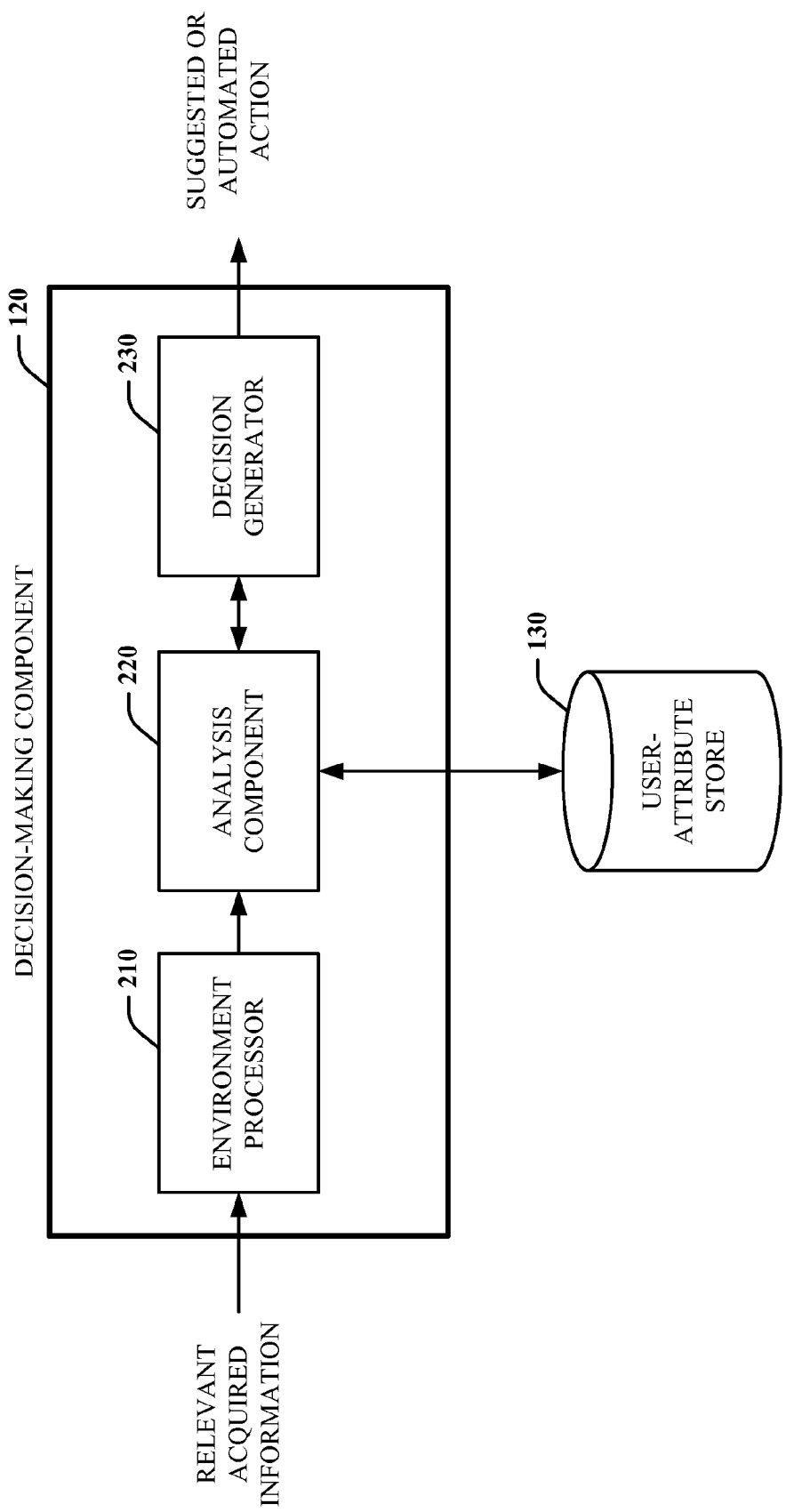
FIG. 2 is a block diagram of a decision-making component and user-attribute store.

In FIG. 2, a block diagram of a decision-making component 120 and user-attribute store 130 that facilitates analysis of information and generation of a suggestion or automated implementation of the suggestion is depicted. The decision-making component 120 receives relevant information regarding a user and his/her environment and produces a suggestion or implements the action, by way of an environment processor 210, analysis component 220 (with reference to the user-attribute store 130), and decision generator 230.

The environment processor 210 obtains information relevant to a user and his/her environment and processes such information to identify one or more situations where decisions should be made. For example, information about a local car accident that just occurred can contribute to a decision to change a driving route. The analysis component 220 evaluates the information in view of personal preferences stored in the user-attribute store 130. For instance, car accident notifications can be taken into account when viewing a user's agenda of scheduled meetings that day, in consideration of traffic delays and alternate routes for a length of time that depends on the severity of the accident. The decision generator 230 can employ the analysis to arrive at a solution to a given or potential problem. For example, the decision generator 230 can suggest an alternate driving route while a user is driving to his/her appointment. In addition, the decision generator 230 can automatically move the appointment reminder to an earlier time (e.g., 1 hour in advance rather than 30 minutes in advance), to ensure that the user has adequate time to travel in view of the inevitable delay.

While the user-attribute store 130 can be updated with relevant information about an environment, as it is received by the environment processor 210 and passed through to the analysis component 220, the user-attribute store 130 can also track decisions made by the decision generator 230 in order to assist in automated decision-making for future situations. Other information that may be tracked includes user satisfaction with respect to the suggestion or automated action, consequences that occur as a result of an action, and reactions of others in response to an action. At any moment in time, a user can explicitly add, modify, or delete a specification in the user-attribute store 130.

Figure 3:
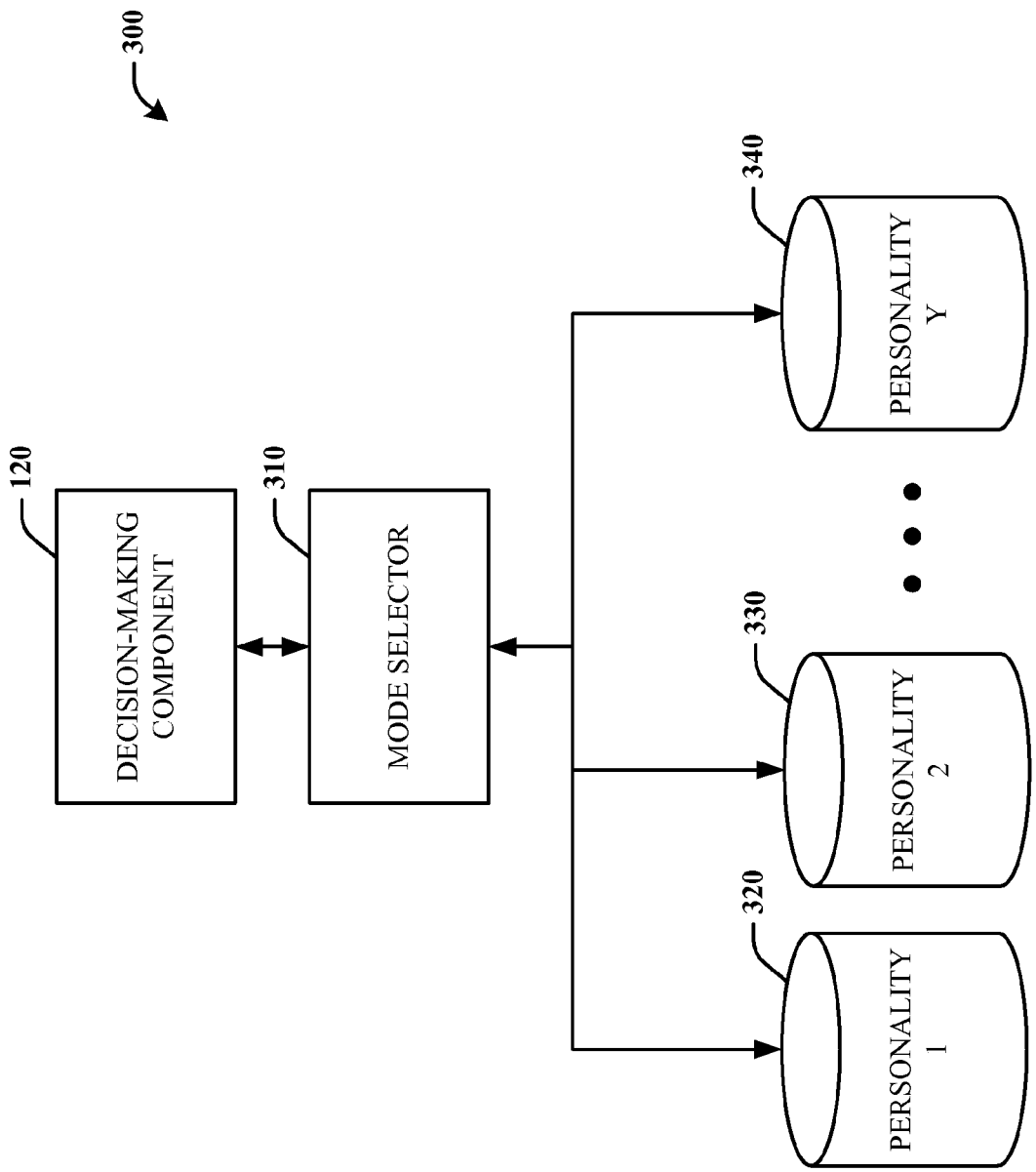
FIG. 3 is a block diagram of a decision-making component in connection with many personalities.

As illustrated in FIG. 3, a block diagram of a decision-making component in connection with multiple personalities 300 is presented. In particular, a guardian angel can proceed under one of many user profiles, such as separate data stores for work preferences, home preferences, and school preferences. For example, a user at work may have different lunch preferences than the same user at home or at school. Therefore, the decision-making component 120 can flexibly access the proper personality for each decision.

The decision-making component 120 is operatively connected to a mode selector 310 that has data store options, personality 1 through personality Y (320-340). The mode selector 310 accesses the appropriate personality, which may be set by the user, another user, or inferred from patterns based on the time of day, type of environment, previous selections, etc. When a personality setting is selected, the decision-making component 120 accesses the data store corresponding to that setting for analysis in the context of the environment. For example, a work profile can be selected as inferred by the time of day (e.g., late morning), location (e.g. office), and empirical instances where the user in the office during the late morning prefers to use his/her work profile. Accordingly, the decision-making component 120 takes into account work preferences of the user when scheduling appointments during the daytime, selecting restaurants for lunch, etc. In the alternative, a single data store can maintain separate preferences for each profile and switch modes as necessary.

Figure 4:
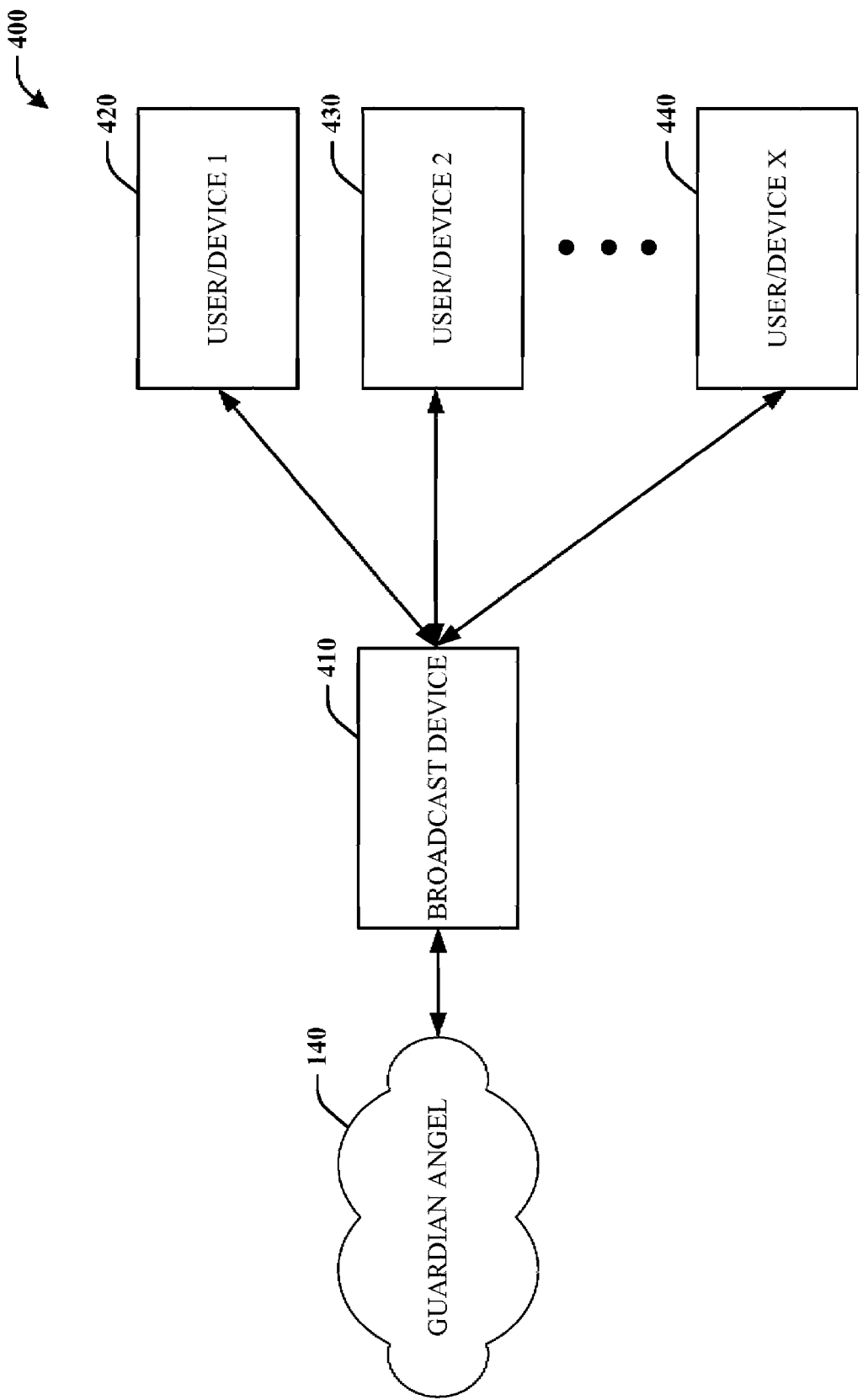
FIG. 4 is a block diagram of an environment evaluation system (guardian angel) in communication with other users/devices.

FIG. 4 depicts a block diagram of an environment evaluation system (guardian angel) in communication with other users/devices 400. Information obtained or generated by a guardian angel 140 can be available to a restricted or unrestricted number of other users or devices so that groups of people can coordinate their schedules with each other, set meetings, seek advice, etc. For example, an employee may want information contained in his/her guardian angel to be accessible to his/her secretary so that the secretary may be aware of (and avoid) conflicts and/or can assist in answering questions from others without disturbing the employee. The guardian angel 140 is regulated by a broadcast device 410 that serves as a connection point for multiple users and/or devices 1 through X (420-440).

The guardian angel 140 monitors, supports, and regulates a user. The guardian angel contains information directly acquired from an outside source (e.g., contact information for area restaurants, demographic information, and other observable information), as well as additional inferred information based on analysis of the acquired information (e.g., level of preference for each restaurant, predicted diagnosis of an illness, etc.). Other users and devices may be interested in at least some of this information. For example, a variable billboard on a freeway may display targeted advertisements based on information detected from passing cars. If users allowed their demographical information to be broadcast to these entities and were found to have characteristics of a busy, working professional, the billboard could, for instance, momentarily display an advertisement of a high-end car while these users were passing the billboard. A user may also restrict identifying information if he/she chooses to maintain anonymity. The guardian angel facilitates protection of information through user preferences with respect to negotiations, sales, cost-benefit analysis, etc.

The broadcast device 410 manages permissions for access to the guardian angel 140. Restrictions can be explicitly set by the user or implicitly determined by the broadcast device 410 based on nature of the information, reputation of the source requesting access, vulnerability of the user, etc. Such restrictions can be adjusted according to changing circumstances or as desired by the user. The broadcast device 410 can concurrently allow access for all users, some users, or no users and may limit the amount of information available to each user. Furthermore, the broadcast device 410 can actively send information to designated users or devices (e.g., a command to send information to a restaurant to make lunch reservations) and/or can passively allow users or devices to probe the guardian angel 140 for information. The guardian angel can facilitate real time interaction among other guardian angels and/or users. For example, a guardian angel can release real time health information with the user's doctor or caretaker. The doctor or caretaker can work with the guardian angel to provide suggestions or set up automatic medication disbursement to the user in real time. In another example, a user's guardian angel can communicate information about user on vacation, including the user's present location. Upon acquiring that information, the user's friend can alert the user in real time of any dangers to avoid, as well as recommended museums to visit while on vacation.

Likewise, the broadcast device 410 can acquire information from other users/devices (420-440) for the guardian angel 140. For example, the broadcast device 410 can provide aspects, such as the identity and location of users/devices requesting access and the properties they are looking for. This information can assist the guardian angel 140 in decision-making or permission setting.

In view of the example systems shown and described above, methodologies that may be implemented in accordance with the embodiments will be better appreciated with reference to the flow charts of FIGS. 5-10. While, for purposes of simplicity of explanation, the methodologies are shown and described as a series of acts, it is to be understood and appreciated that the methodologies are not limited by the order of the acts, as some acts may occur in different orders and/or concurrently with other acts from that shown and described herein. Moreover, not all illustrated acts may be required to implement the methodologies described herein.

The methodologies may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired.

Figure 5:
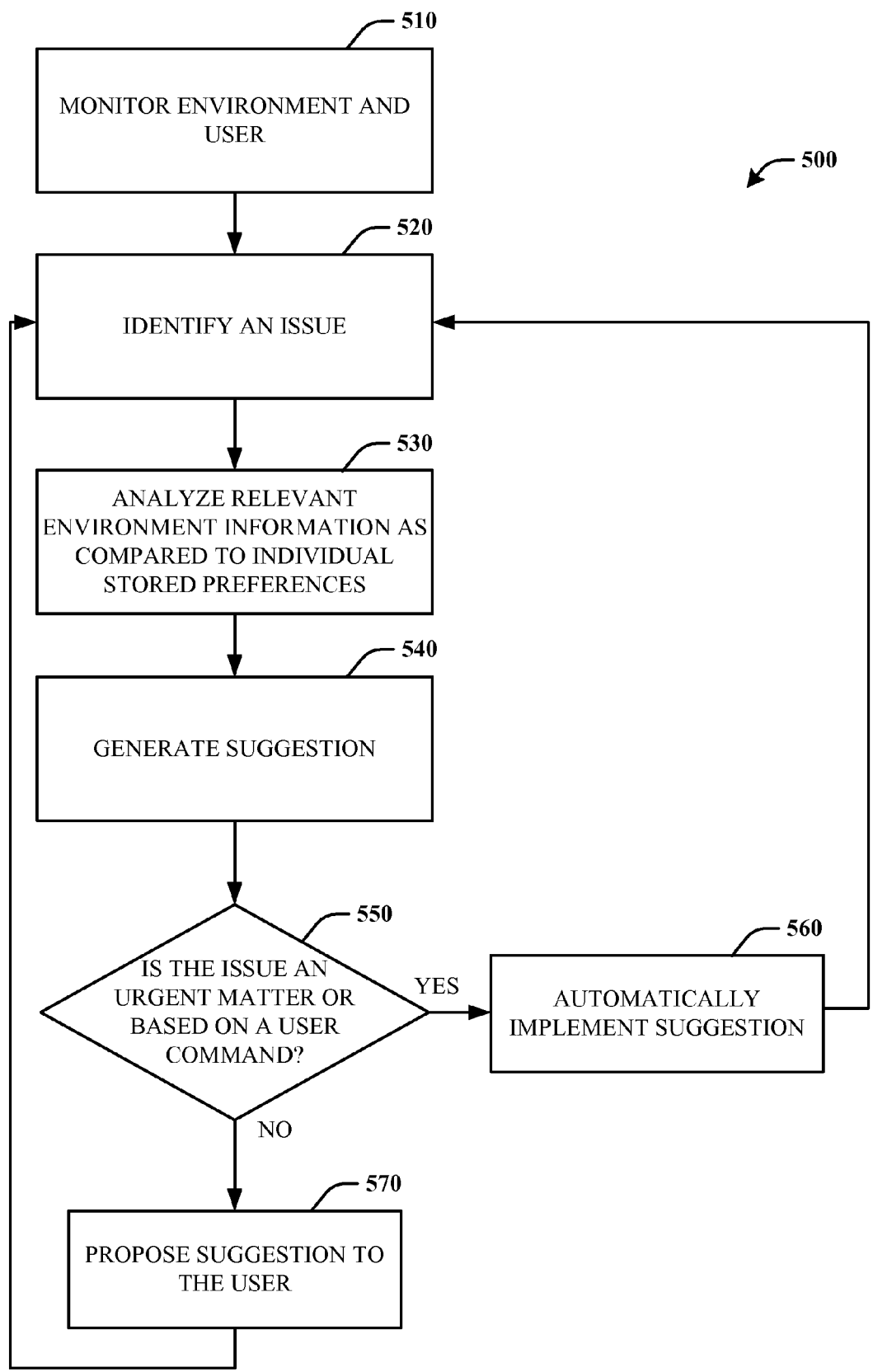
FIG. 5 is a representative flow diagram illustrating a method for generating a decision.

Referring specifically to FIG. 5, a method 500 for generating a decision based on user-environment interaction is illustrated. The method 500 identifies and provides suggestions for one or more issues for a user based on current environment information, current user information, and stored individual preferences, including empirical situations and predefined settings. For urgent matters that require immediate attention, the method 500 automatically implements the suggestion, but for non-urgent matters, the method 500 simply assists the user by presenting the suggestion as a hint or reminder.

The method 500 begins at 510, where aspects of the current user and environment are monitored. Such aspects include areas relevant to the weather, location, direction of travel, movement surrounding the user, health, and interaction among the user and different elements of the environment, as well as the rate of change of such information. At 520, an issue is identified, which may have been specified by a user (e.g., through instructions to retrieve directions to a location) or discovered through environment/user observation (e.g., detection that the user's heart has stopped beating flags a health issue that was not explicitly identified by the user). Continuing to 530, relevant information is analyzed in view of stored preferences specific to the user. Such analysis presents, for instance, a comparison or look-up that addresses a particular schedule (e.g., meeting agenda), preference list (e.g., favorite restaurants), or command (e.g., always update driving directions when road conditions change). A suggestion based on the analysis is generated at 540, which includes making an appointment, providing driving directions, and calling for medical help. As shown at 550, if the identified issue presents an urgent matter that requires immediate assistance (e.g., time-sensitive or health issues), the method 500 automatically implements the suggestion at 560 to schedule the appointment, call for help, etc. Also at 550, if the matter is not particularly urgent, but the identified issue corresponds with a predefined command originating from the user (e.g., a setting to automatically update an address list), the method 500 may automatically implement the suggestion at 560 for efficiency and convenience to the user.

However, if the issue was neither urgent nor based on predefined settings that correspond with instructions at 550, the method 500 proceeds to 570, where the suggestion is simply proposed, but not implemented without a specific command. The user may choose to implement the suggestion, ignore the suggestion, or alter settings to address the issue in the future. The method 500 after a suggestion is proposed at 570 or automatically implemented at 560 returns to 520, where another issue based on the same set of observations is identified for analysis.

Figure 6:
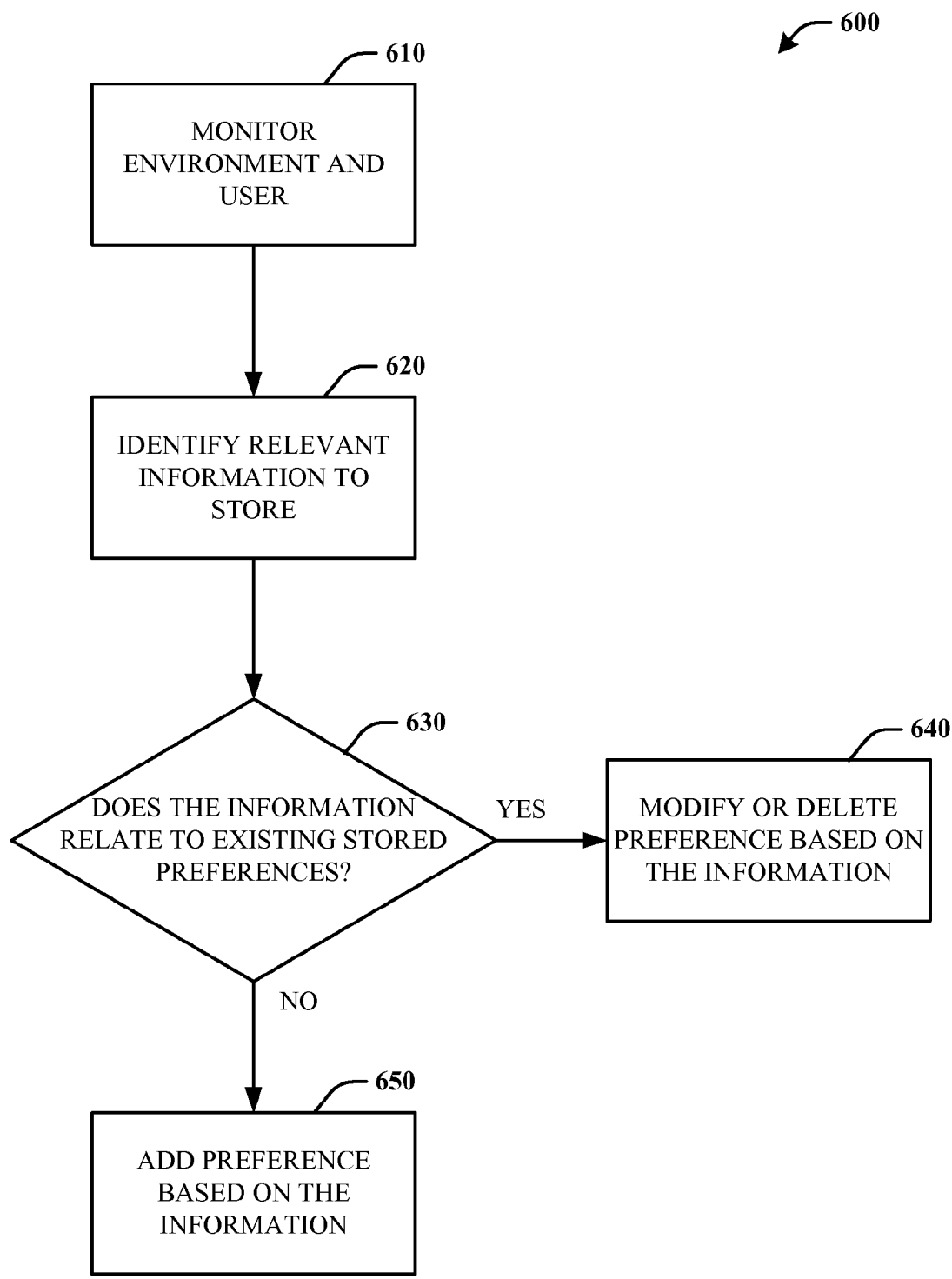
FIG. 6 is a representative flow diagram illustrating a method for updating stored preferences.

FIG. 6 presents a method 600 for updating stored preferences. The preferences pertain to settings, routines, schedules, and commands specific to a user in which decisions are made. The method 600 continuously updates such preferences to provide for a more sophisticated evaluation scheme, where changes automatically and seamlessly take into effect.

The method 600 starts by monitoring a user and his/her environment at 610. Since all aspects observed may not be stored for the sake of time, resources, simplicity, etc. (e.g., certain time-sensitive information, unnecessarily detailed aspects, etc.), the method 600 identifies just the relevant information for storage at 620. At 630, if the updated information relates to an existing stored preference, that stored preference is modified or deleted in view of the newly acquired information at 640. Returning to 630, if the updated information does not relate to an existing stored preference, then at 650, the newly acquired information is transformed into an additional preference and stored as such. A single environment observation can provide for various presentations of information to be integrated as preferences. For example, one environment observation can provide information relating to weather, location, health, etc. In addition, a single aspect of information can affect multiple preference settings. For instance, a visit to the dentist can affect numerous preferences relating to location, scheduling, and relation to other activities (e.g., a preference never to schedule meals within one hour after a dentist appointment).

Figure 7:
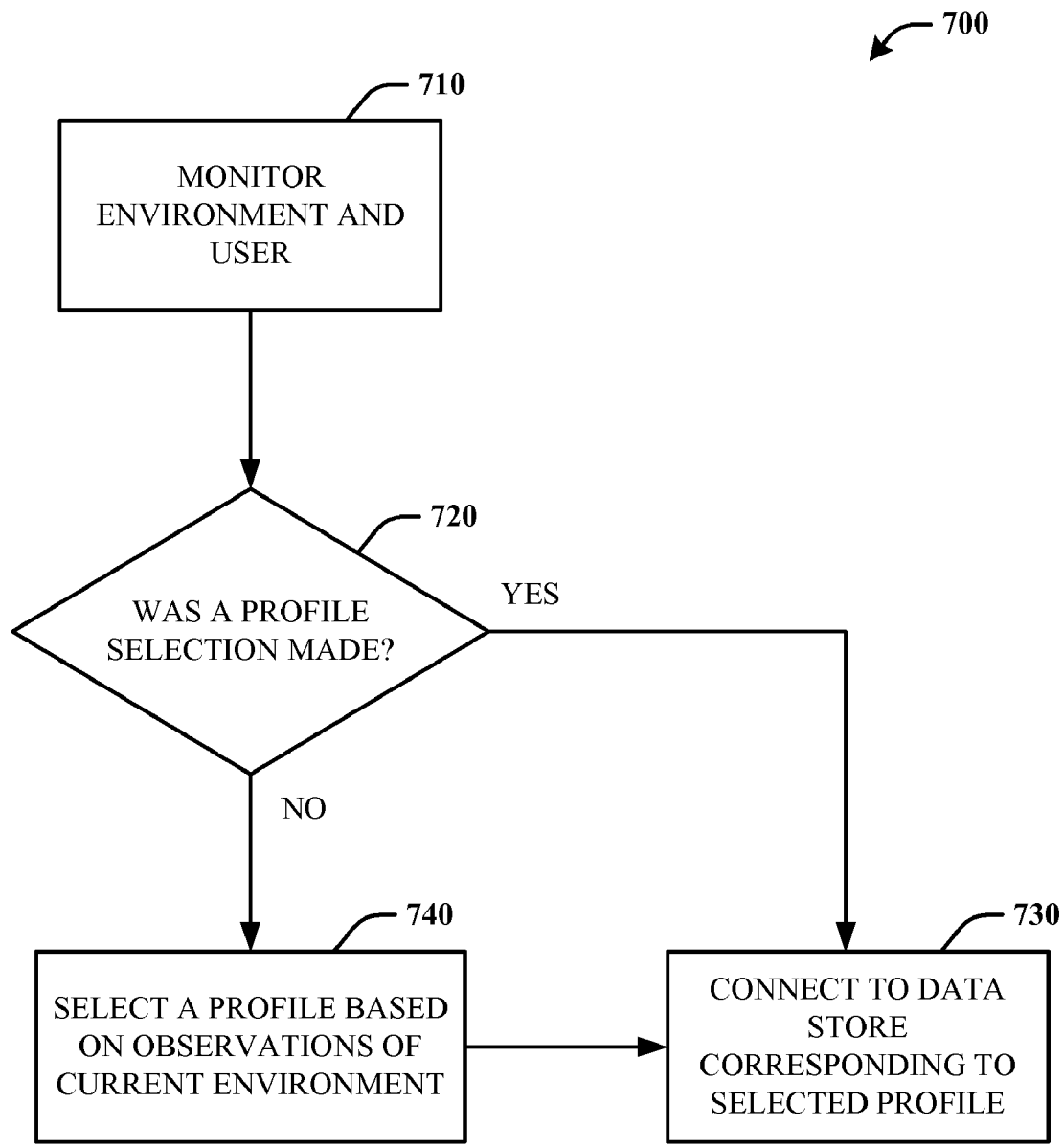
FIG. 7 is a representative flow diagram illustrating a method for managing multiple personalities.

FIG. 7 depicts a method 700 for managing multiple personalities in environment evaluation and decision-making by maintaining multiple profiles. For a given user, he/she may desire separate profiles that correspond to different settings, such as for work, home, school, etc. Such settings may provide unique information that causes decisions for work, home, school, etc. to vary.

The method 700 begins at 710, where the user and his/her current environment are monitored. Continuing to 720, if a profile selection was made by the user, then at 730, the data store that corresponds to the selected profile is connected for decision-making context. For example, a user may explicitly set a profile as soon as he/she returns home from work. A user may also define a schedule or restraints that determine when a profile should be active, based on time, location, etc. (e.g., automatically set a work profile between 9:00 AM through 5:00 PM during weekdays and set a home profile otherwise).

Returning to 720, if a profile selection was not made, the method 700 can intelligently select a profile based on observations of the user and his/her current environment at 740. For example, the method 700 can infer that the previously selected profile applies to the current situation. The method 700 may also take into consideration the user's current location, time of day, and activities to detect a pattern for profile selection. For example, the method 700 may make an intelligent guess to activate a work profile when the user is in the office busy with work-related matters. Once the selection is made, the data store corresponding to the selected profile is set at 730. Therefore, personalized decisions can be made more accurately in the context of a user's current state.

Figure 8:
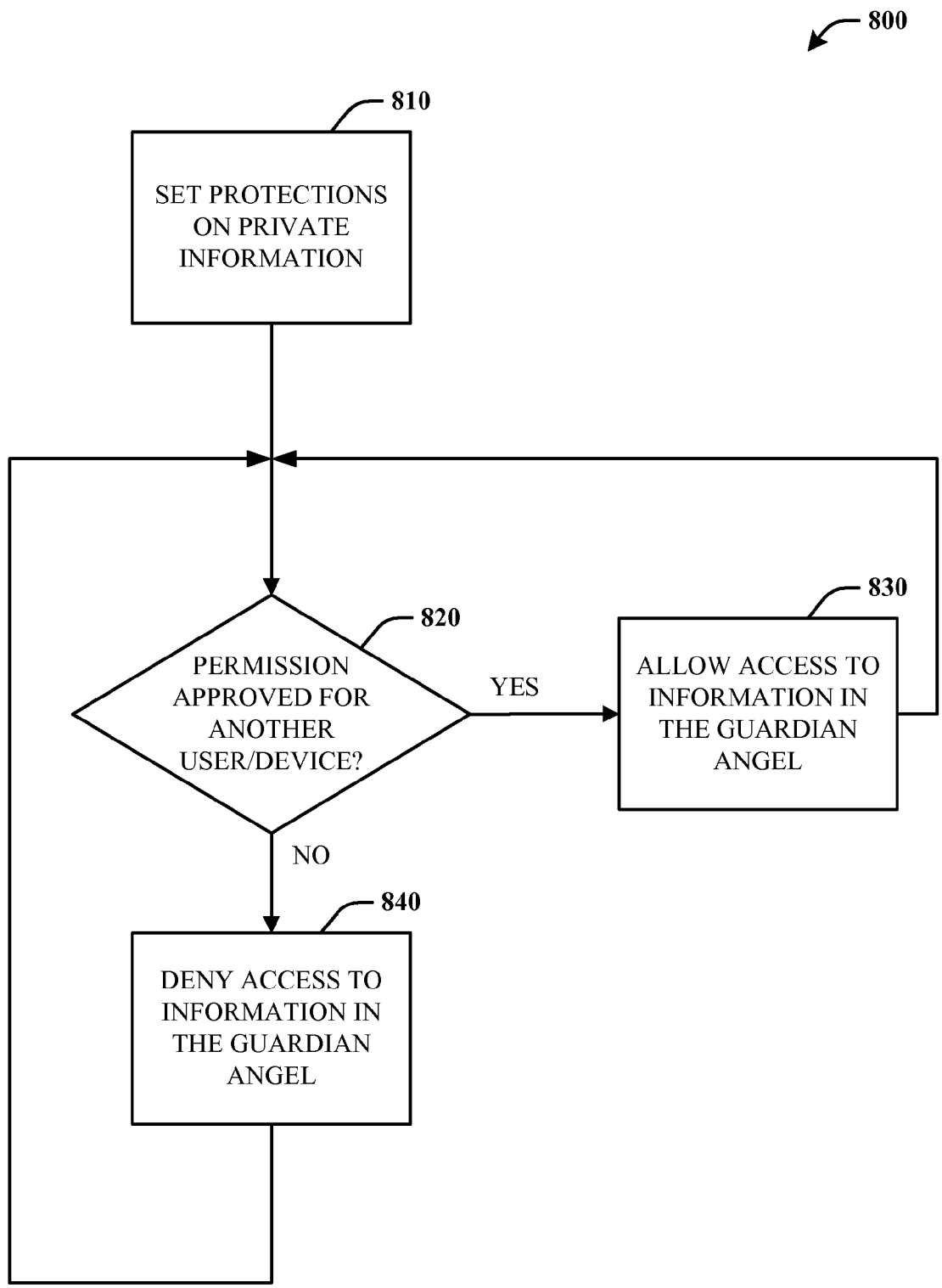
FIG. 8 is a representative flow diagram illustrating a method for broadcasting information.

In FIG. 8, a method 800 for broadcasting information is illustrated. A guardian angel contains information and preferences specific to a user that may be useful to other users or devices. A user can more easily interact and coordinate with others when they can access a portion of his/her information, such as an agenda for schedule coordination or medical history for a doctor's visit. However, since some information may be sensitive, the permissions for certain information for certain outside users/devices depend on individual circumstances.

Beginning at 810, the method 800 sets protections on private information that should not be disclosed. The level of privacy can be globally defined for all outside users/devices or applied to a subset of all outside users/devices and may be changed at any time. Such determination can originate from the user or be inferred by analysis of the nature of the information and existing settings. In one example, a user may not want to share his/her schedule regarding a particular day and thus can set a global rule to protect information from that day for all outside users/devices. In another example, a user may only want to share personal information with designated family and friends. Proceeding to 820, the method 800 determines whether access should be allowed for a particular user/device, by considering explicit user instructions or analysis of the situation, such the identity of the user, reason for access, past permissions for access, nature of the information, etc. At 830, if the particular user/device is safe, then access to information in the guardian angel is allowed for that user/device. For example, depending on the reputation of a store, the user may not want the store to learn information other than his/her current purchase. Otherwise, at 840, access to information in the guardian angel is denied for that user/device. After access is allowed or denied for a particular user/device, the method 800 returns to 820, to repeat the determination for another user/device.

Figure 9:
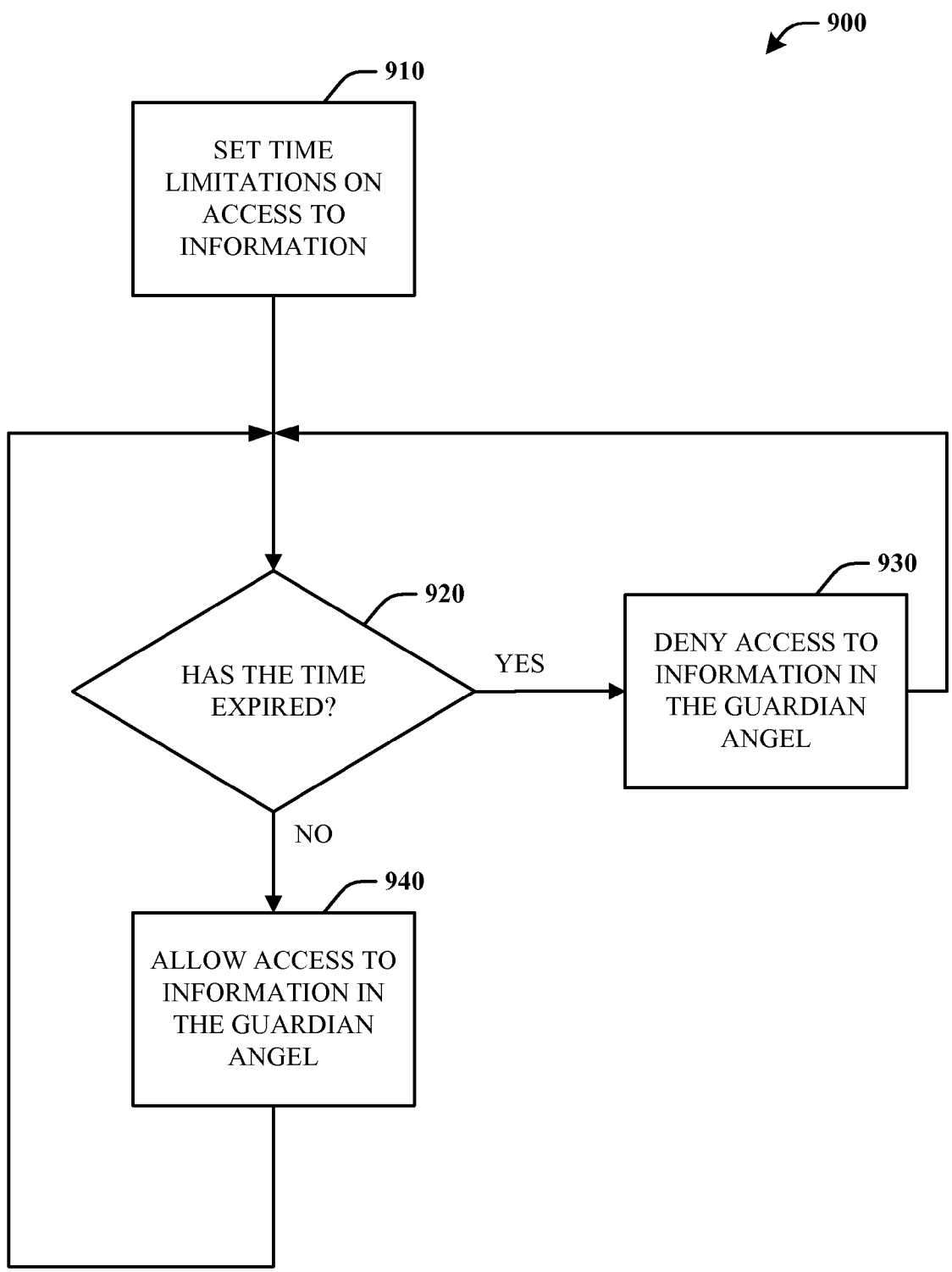
FIG. 9 is another representative flow diagram illustrating a method for broadcasting information.

Turning to FIG. 9, another method 900 for broadcasting information is presented based on time constraints for permitted access. As set forth at 910, when a user decides to allow access to certain information in the guardian angel to particular users/devices, the user may want to limit the availability of the information to an amount of time and/or to limited times of the day. Rather than return to change the permissions, the user can predefine limits for access. Furthermore, the method 900 may autonomously restrict access after an amount of time based on sensitivity of the information or unusual activity that may be evidenced by a high rate of change. For example, if the number of access requests suddenly spikes to a high number, the method 900 may choose to withhold permissions until positive confirmation from the user is received.

Continuing to 920, before permission is granted or denied, the method 900 determines if the designated time limit has expired. If true, then access to information in the guardian angel is denied for all or a subset of users/devices at 930. If the time limit hasn't expired, then at 940, access to information in the guardian angel is allowed for now. Such access or denial is only temporary, and returning to 920, future requests for access are reconfirmed for authorization.

Figure 10:
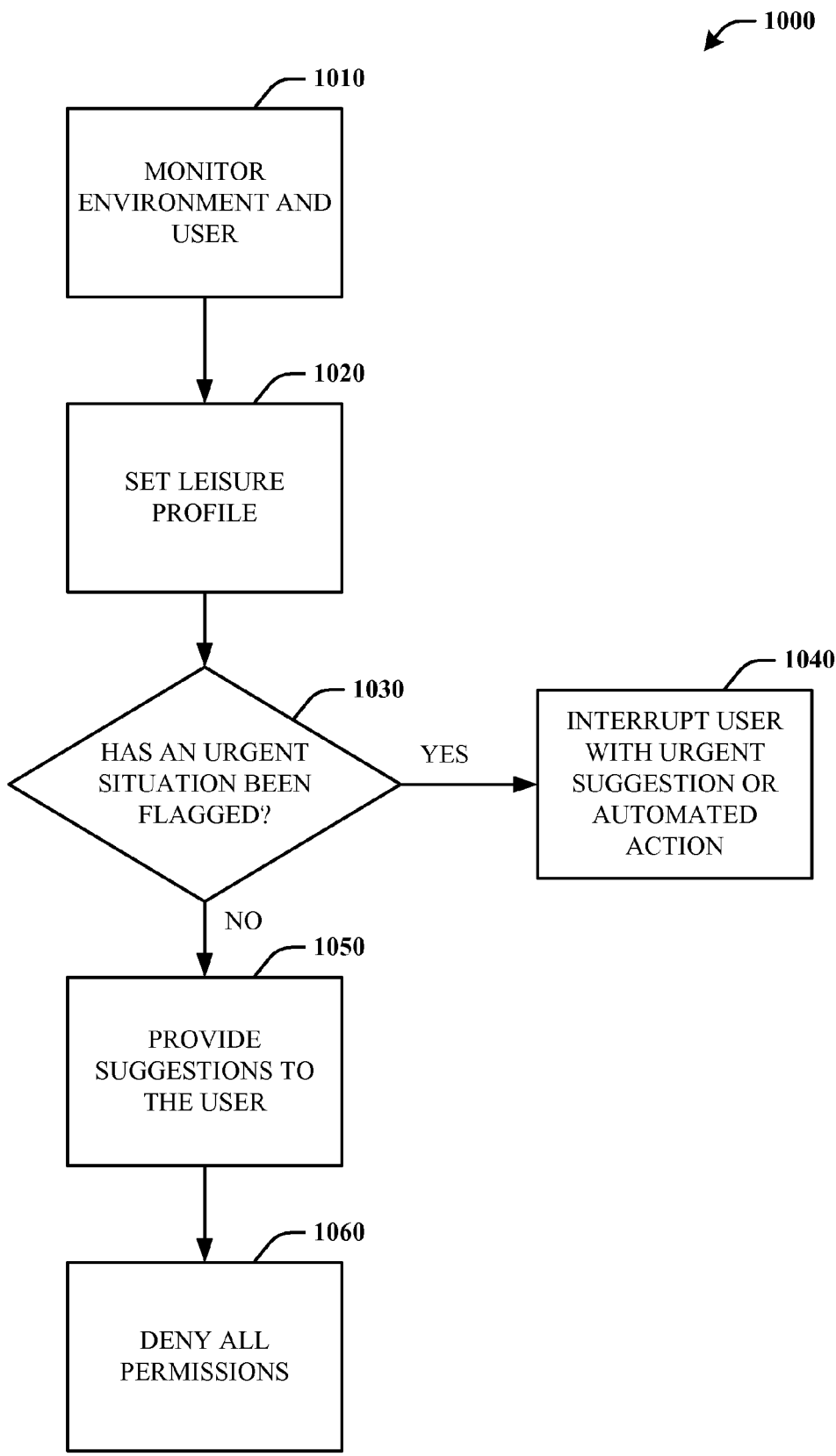
FIG. 10 is a representative flow diagram illustrating an example for facilitating decision-making.

FIG. 10 illustrates a method 1000 of a specific example facilitating overall environment evaluation and service suggestions or implementations. This particular example emphasizes the dynamic flexibility of the guardian angel in the situation of a tourist on vacation. The level of assistance is not restricted to a particular area, but rather spans across a variety of requests and observations, as expected in a new environment. The value of suggestions to a tourist is higher than if he/she were in a familiar environment; thus the tourist is more likely to depend on the suggestions of the guardian angel.

Starting at 1010, the method 1000 monitors an environment and the interactions revolving around a user. Based on analysis of a location unfamiliar to the user and/or confirmation from the user that he/she is on vacation, at 1020, the profile corresponding to leisure settings is applied. This way, preferences of activities and scheduling can match the user's intentions during his/her time off. Before focusing on a requested decision, the method 1000 first checks if an urgent situation has arisen and needs to be addressed at 1030. If so, at 1040, the user is interrupted with an urgent suggestion, or for time-sensitive issues, actions are automatically implemented. For example, if the user is driving and needs directions, but his/her detected heartbeat has suddenly stopped, help is automatically called for before directions are given in view of the urgency.

If there are no urgent situations that require immediate attention, the method 1000 proceeds to 1050 and provides suggestions to the user in view of the preferences found in the leisure profile. Such suggestions may include driving directions to a museum. In addition, the method 1000 may guess that the user will be hungry and suggests restaurants that match the preferred restaurants in his/her profile en route to the museum. The suggestions also take into account price range, reputation, wait time, etc. Furthermore, based on planned driving distances for the day, a suggestion to stop at a gas station can be presented at an appropriate time and place. At 1060, since the user may want a heightened sense of privacy and protection while in an unfamiliar place, all permissions for access to the user's information are denied. In the alternative, the user may allow access for family members accompanying him/her on vacation.

Figure 11:
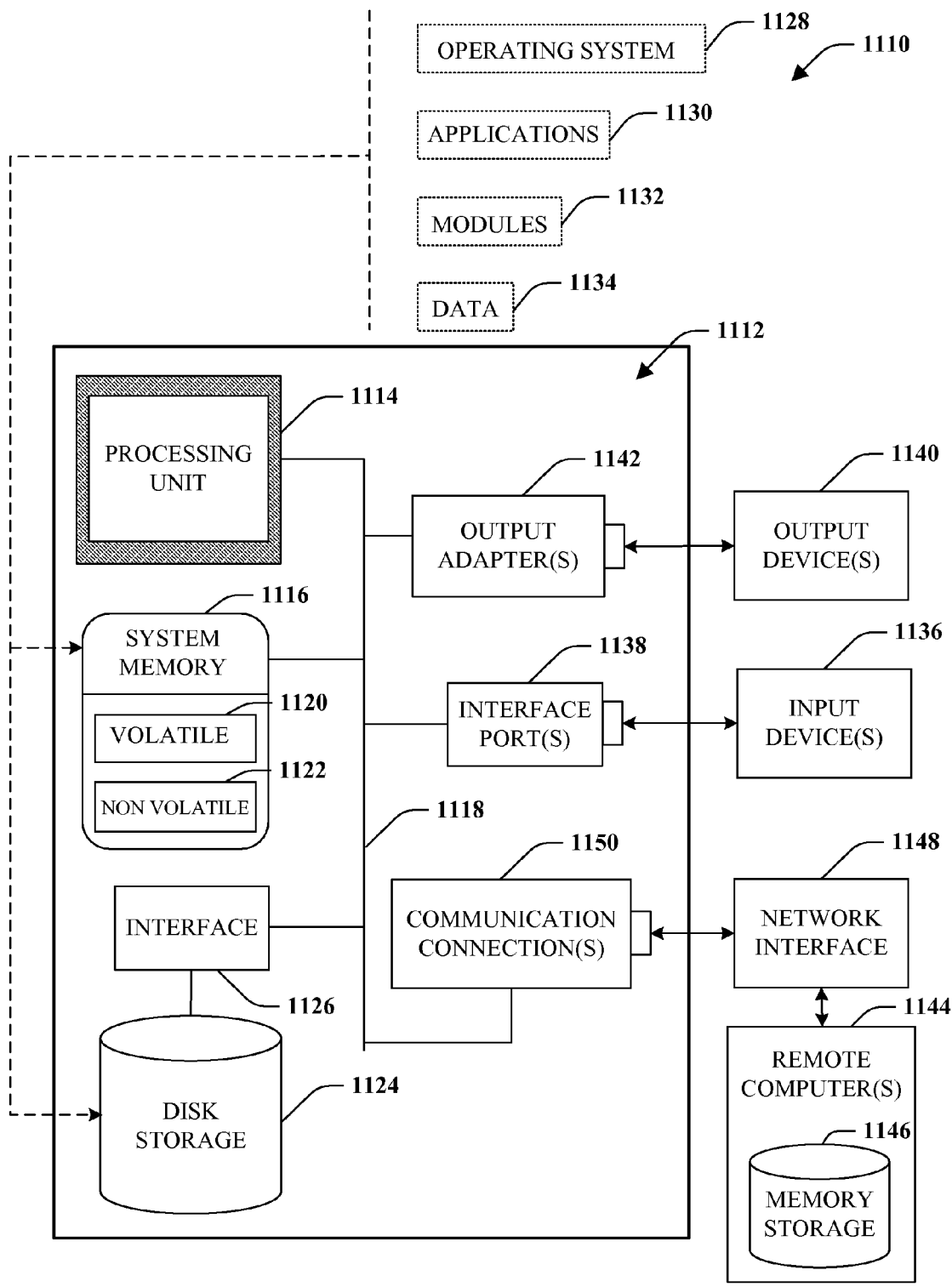
FIG. 11 is a schematic block diagram illustrating a suitable operating environment.
Figure 12:
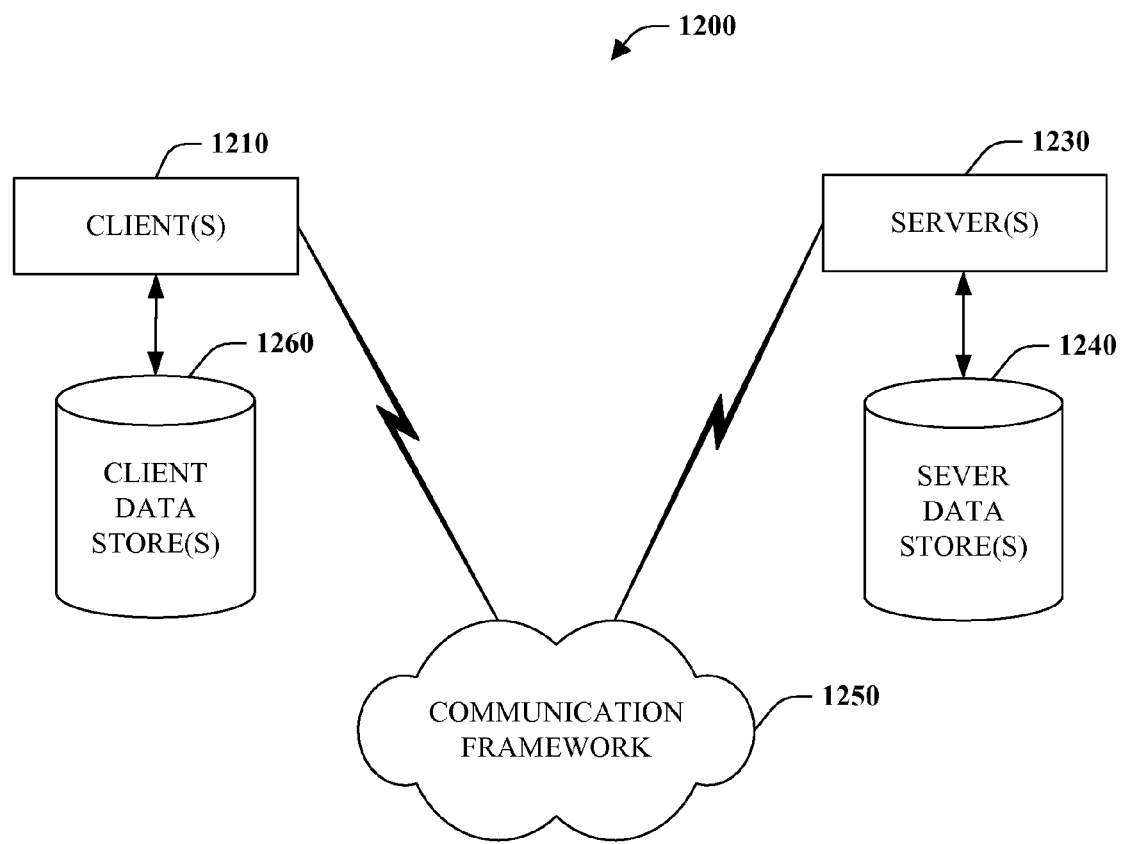
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the claimed subject matter has been described above in the general context of computer-executable instructions of a computer program that runs on a computer and/or computers, it can be recognized that the claimed subject matter also may be implemented in combination with other program modules. Generally, program modules include routines, programs, components, data structures, etc. that perform particular tasks and/or implement particular abstract data types. Moreover, it can be appreciated that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects can be practiced on stand-alone computers. In a distributed computing environment, program modules may be located in both local and remote memory storage devices.

With reference to FIG. 11, an example environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 11 18. The system bus 1118 couples system components including, but not limited to, the system memory 1116 to the processing unit 11 14. The processing unit 1114 can be any of various available microprocessors. Dual microprocessors and other multiprocessor architectures also can be employed as the processing unit 11 14.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection(s) 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 902.3, Token Ring/IEEE 902.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards or components.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the present invention, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

It is to be appreciated that the systems and/or methods described herein can be facilitated with computer components and non-computer related components alike. Further, it can be ascertained that the systems and/or methods described above are employable in a vast array of electronic related technologies, including, but not limited to, computers, servers, and/or handheld electronic devices, and the like.

What has been described above includes examples of the claimed subject matter. It is, of course, not possible to describe every conceivable combination of components or methodologies for purposes of describing such subject matter, but it can be recognized that many further combinations and permutations of the embodiments are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates decision-making, comprising:
    a memory:
    one or more processors operatively coupled to the memory and disposed within one or more devices;
    a monitoring component that collects and filters information from a user and a surrounding environment;
    a decision-making component that receives the information and analyzes portions of the information based on user preferences stored in a user attribute store, the decision-making component generates a suggestion for implementing a decision to facilitate user decision making based on the analysis;
    a classifier that utilizes the monitoring component, the decision-making component and the user attribute store to perform a plurality of functions, wherein the classifier is a support vector machine (SVM) that operates by finding a hypersurface in the space of possible inputs, the hypersurface splitting the information from the user attribute store into a plurality of triggering events and a plurality of non-triggering events to enable the automatic performing of the plurality of functions;
    a mode selector that manages multiple personifications of the user when generating the suggestion, wherein the generated suggestion varies based on which of the multiple personifications the user selects; and
    a broadcast device that provides information regarding the user to a plurality of other users and devices, wherein the broadcast device confirms authorization of the plurality of other users and devices before providing the information regarding the user and determines the type of authorization of the plurality of other users and devices based at least in part on current environment information, current user information and stored individual preferences of the plurality of other users.

2. The system of claim 1, the decision-making component determines a level of urgency addressed by the generated suggestion.

3. The system of claim 2, the decision-making component automatically implements the generated suggestion when the level of urgency is high.

4. The system of claim 1, the decision-making component comprises:
    an environment processor that identifies an issue in need of the suggestion;

an analysis component that evaluates the relevant portions of the information in relation to user preferences; and a decision generator that generates the suggestion in response to a user command.

5. The system of claim 4, the identified issue is inferred from the acquired information of the user and the surrounding environment.

6. The system of claim 1, the monitoring component is pluggable with external devices that acquire information from the surrounding environment.

7. The system of claim 1, the broadcast device interacts with the plurality of other users and devices when implementing the generated suggestion through at least one of a command from the user and an automatic action.

8. The system of claim 1, the broadcast device limits access to the system based on permissions provided by the user.

9. The system of claim 1, the broadcast device negotiates with the plurality of other users and devices on behalf of the user for permission to access the information.

10. The system of claim 1, the decision-making component avoids action or inaction that causes harm to the user.

11. The system of claim 1, the system is configurable, scriptable, and automatable at least in part by the user.

* * * * *